United States Patent
Fujimasu

Patent Number: 5,431,730
Date of Patent: Jul. 11, 1995

[54] CERAMIC TILE-LIKE ALUMINOUS CEMENT-UNCALCINE BUILDING MATERIAL

[76] Inventor: Jiro Fujimasu, 5-20-8 Kugahara, Ohta-ku, Tokyo, Japan

[21] Appl. No.: 154,545

[22] Filed: Nov. 19, 1993

[51] Int. Cl.$^6$ .............................. C04B 7/32
[52] U.S. Cl. ................... 106/694; 106/695; 106/706; 106/711; 106/773; 106/811; 106/812; 106/817
[58] Field of Search ............ 106/692, 694, 695, 711, 106/772, 773, 811, 819, 706, 812, 817

[56] References Cited

U.S. PATENT DOCUMENTS

| | | | |
|---|---|---|---|
| 3,922,172 | 11/1975 | Crinkelmeyer et al. | 106/695 |
| 3,944,425 | 3/1976 | Magder | 106/681 |
| 4,045,237 | 8/1977 | Gaines et al. | 106/695 |
| 4,293,343 | 10/1981 | Shannon | 106/694 |
| 4,350,533 | 9/1982 | Galer et al. | 106/695 |
| 4,455,171 | 6/1984 | Spensley et al. | 106/694 |
| 4,746,365 | 5/1988 | Babcock et al. | 106/695 |
| 4,875,937 | 10/1989 | Viles | 106/695 |
| 4,939,191 | 7/1990 | Kataoka et al. | 106/692 |
| 4,961,790 | 10/1990 | Smith et al. | 106/819 |

*Primary Examiner*—Karl Group
*Assistant Examiner*—Michael Marcheschi
*Attorney, Agent, or Firm*—Larson and Taylor

[57] ABSTRACT

A mortar composition based on aluminous cement which provides an attractive ceramic tile-like surface gloss and other desirable properties including superb hardness, reduced water absorption, high strength, high acid resistance, and good heat and weather resistance, is disclosed. Also disclosed is a molded article of manufacture which comprises the mortar composition, as well as fiber-reinforced mortar compositions and molded articles of manufacture made therefrom.

5 Claims, No Drawings

CERAMIC TILE-LIKE ALUMINOUS CEMENT-UNCALCINE BUILDING MATERIAL

BACKGROUND OF THE INVENTION

The present invention is an aluminous cement-mortar composition molding material castable into a mold and relates to a ceramic tile-like aluminous cement-uncalcined building material prepared therefrom extremely useful in broad segments of building materials. Despite the fact that it is an uncalcined material, unlike calcined products such as ceramic tiles, it has a superior and attractive surface gloss just like that of ceramic tiles, further excels in hardness, reduced water-absorption properties, strength and resistance against acid, heat and weather and other improved material properties.

Heretofore, so-called ceramic tile has been widely used as a building material because of its excellence in surface gloss, hardness, water-resisting qualities, strength and other material properties. However, ceramic tile can only become a finished product after going through a calcination process, which inevitably entails a very cumbersome operation and costly instrumentation. Such drawbacks are magnified in the production of large-sized or intricate-shaped ceramic tiles. These put major limitations upon the utilization of ceramic tiles.

The inventors of the present invention have conducted a systematic research with the objective of developing a satisfactory substitute for the ceramic tile or a ceramic tile-like building material, which eliminates these disadvantages inherent in the ceramic tile or other ceramic building materials.

In Japanese Patent No. 1585864 (Oct. 31, 1990), "Ceramic tile-like Aluminous Cement-Uncalcined Building Material," by Jiro Fujimasu, it was found that a ceramic tile-like aluminous cement-uncalcined building material can be produced by simply casting in a mold an aluminous cement-mortar composition composed of aggregate and a specific composition comprised of (1) aluminous cement, (2) at least one of montmorillonite, acid clay and bentonite, (3) at least one of zirconium oxide and magnesium oxide and (4) at least one alkali metal stearate and alkali earth metal stearate provide a material having an excellent and attractive ceramic tile-like surface gloss, when hardened, despite it being an uncalcined material, in addition to other desirable material properties including superb hardness, reduced water-absorption property, strength, acid resistance, heat resistance and weather resistance.

However, inherent defects of aluminous cement such as solidification delay around the curing temperature of 30° C. and a decline in strength due to a crystalline transition could not be eliminated. The present invention resolves these problems.

According to the results of the research conducted by the inventor of the present invention, the said ceramic tile-like uncalcined building material of the present invention may be easily produced by a process technique similar to that for a conventional mortar composition being cast in a mold. In comparison with other ceramic building materials, it was further found that the material is very superior in that it can be produced with considerable ease at a very reasonable cost in terms of the manufacturing process, the equipment needed and the costs involved. Particularly, in contrast with ceramic tiles which inevitably require far more complicated and expensive manufacturing process if they are to be large in size and intricate in shape and design, the invented material was found to have a decisive advantage in industrial production, due to the extreme ease and low cost of manufacturing.

The research further established the fact that the material can be freely colored to a desired color tone by simply blending suitable pigment with the mortar composition, as opposed to ceramic building material which is subject to a major constraint of possible color change during the calcination process, and that it is easy to change and adjust within a certain range the strength, weight per unit volume and other material properties of the material as required. In other words, the material's advantage as a building material lies in its capacity to allow choice and change of strength, weight and the like, depending on the object of its application.

The objective of this invention, therefore, is to provide a ceramic tile-like aluminous cement-uncalcined building material which is a mortar composition castable into a mold to provide molded articles having an excellent and attractive ceramic tile-like surface gloss, despite the fact that it is an uncalcined material and which do not suffer from the inherent defects of aluminous cement such as solidification delay at the curing temperature of 30° C. and a decline in strength due to a crystalline transition.

The objective, just stated, and many other purposes of the present invention as well as its advantages will be further illustrated clearly by the following descriptions.

SUMMARY OF THE INVENTION

The present invention is a mortar composition of Composition "A", which comprises materials (1) to (7) as listed below and of about 1 to about 4 parts by volume of aggregate "B" for 1 part by volume of said Composition "A". It is characterized as an uncalcined material that can be cast into molds to form ceramic tile-like aluminous cement-uncalcined building material.

| Composition "A" | |
| --- | --- |
| (1) Aluminous Cement | 86–57 parts by weight |
| (2) At least one selected from montmorillonite, acid clay and bentonite | 3–10 parts by weight |
| (3) At least one selected from zirconium oxide and magnesium oxide | 3–10 parts by weight |
| (4) At least one selected from alkali salt stearate and alkali earth metals stearate | 0.5–3 parts by weight |
| (5) One out of active fine silica or acidic fly ash | 3–10 parts by weight |
| (6) Calcined gypsum | 2–5 parts by weight |
| (7) Aluminum sulfate | 2–5 parts by weight |
| Total: | 100 parts by weight |

The inventors find that the addition of calcined gypsum and aluminum sulfate is also designed to help increase the stability. The process sequence is explained as follows:

The chemical formula for hydration of aluminous cement is:

$$CaO.Al_2O_3 + H_2O \longrightarrow CaO.Al_2O_3.10H_2O \longrightarrow 3CaO.Al_2O_3.6H_2O$$
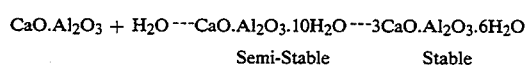
Semi-Stable    Stable In the above formula, in the process of moving from semi-stable to stable state, crystal water is discharged and the strength declines as the volume of crystal decreases and create air bubbles. Addition of gypsum ($CaSO_4$) and aluminum sulfate $Al_2(SO_4)_3$, and the existence of cement (CaO) would enable immediate reaction with the released water to generate $3CaO.Al_2O_3.3CaSO_4.32H_2O$ that will fill the air holes and prevent strength reduction.

It was further concluded that activated silica is necessary in order to obtain a compound that would be stable for a long time.

In another embodiment of the invention, mortar composition further contains mineral fibers of 0.5 to 3% by weight of the total weight of Composition "A" and Aggregate "B".

DETAILED DESCRIPTION OF THE INVENTION

In the above Composition "A", if the amount of the constituent element (1), or aluminous cement, is too small, or below the specified range shown above, it generally leads to deterioration of the material properties such as its compressive strength, while if the amount is too large, or in excess of the specified range, it will cause a reduction in any one of the constituent elements (2) to (4), bringing about an adverse effect on the material quality. Therefore, the amount of aluminous cement should be carefully determined to be maintained within the range specified above. Likewise, should the amount of the element (2) fall short of the prescribed range, it will induce a decline in density of the ceramic tile-like aluminous cement-uncalcined building material. On the other hand, too much of the element (2) will cause a decrease in hardness of the material. So, the amount of constituent element (2) should be appropriately set within the specified range. Further, in the above Composition "A:, if the amount of the constituent element (3) is too little, or below the specified range, the resulting building material will show and increased water-absorption property, whereas too much of the element (3) will mean decreases in the amount of (1) and other constituent elements, which will adversely affect the strength and other properties of the material. So, again, the amount of the element (3) should be adjusted within the specified range. Similarly, should the amount of the constituent element (4) fall below the range limit as specified above, it will likely cause air bubbles to appear in the surface of the ceramic tile-like aluminous cement-uncalcined building material, while too much of the element (4) will weaken the strength of the building material of the present invention, so that the amount of the constituent element (4) should be kept within the specified range. Since these constituent elements (1) to (4) cooperate with each other and work in interactive and complementing ways to contribute jointly toward the excellent material properties of the ceramic tile-like aluminous cement-uncalcined building material, it would be impossible to describe individually actions and effects of these constituent elements (1) to (4). However, it is possible to provide the optimal composition of these constituent elements (1) to (4) by experimentally and easily controlling the amounts of the elements (1) to (4) within their respective specified ranges, so that desired material properties of the building material may be obtained.

In the Composition "A", it is possible to employ more than one component elements listed in each of the constituent elements (2), (3) or (4). When more than one component elements are employed in any one of these element categories (2), (3) or (4), however, the total amount of such component elements employed should be kept within the prescribed range for that category. For instance, if two component elements in the category (2) are to be employed, the total combined amount of these components employed should remain within the prescribed range of 3 to 10 parts by weight. Component elements in the constituent element category (4) may include, for instance, sodium carbonate stearate, potassium oxide stearate, magnesium stearate, calcium stearate and the like. In Composition "A", constituent elements in categories (5), (6) and (7) are, as noted earlier, employed to prevent solidification delay and crystalline transition, which are shortcomings of aluminous cement, and help long-term stabilization, and are not used to directly contribute to the product (material) strength and other properties. However, 3% in the case of silicic acid, 5% for fly ash and 3% for gypsum and aluminum sulfate are considered appropriate standards.

AGGREGATE "B"

The mortar composition of the present invention is composed of Composition "A" described above and aggregate "B" at the rate of about 1 to about 4 parts by volume per 1 part by volume of the said Composition "A" For the aggregate "B" various types of conventional aggregates for conventional mortar compositions may be employed, including natural and artificial aggregates. It is also possible to control the weight of the ceramic tile-like uncalcined building material of the present invention by the use of light-weight aggregates besides conventional ones. Such aggregates are well-known by themselves and may be used in the present invention. They may include aggregates mainly composed of expanded shale, fly ash, lightweight aggregates mixed with granulated blast-furnace slag, barite (artificial light-weight aggregate), volcanic ash (natural light-weight aggregate) and the like. Appropriate mixture of these with general river sand and crushed stone can be utilized to control the weight (weight per unit of volume) of the ceramic tile-like uncalcined building material of the present invention.

The mortar composition of the present invention may further comprise additional constituent elements. Such additional elements may include coloring agents like pigments and mineral fibers such as glass wool and rock wool. The total amount of such additional constituent elements just mentioned may vary, as long as it does not adversely affect the excellent surface gloss and other superior material properties of the ceramic tile-like uncalcined building material of the present invention. For example, it is possible to add, based on the weight of Composition "A:, the coloring agent of about 0.5 to about 5.0% by weight and mineral fibers of about 0.5 to about 3% by weight. Blending of mineral fibers improves the bending strength of the building material of the present invention. Although the amount of mineral fibers to be added may be more than about 3% by weight, any further amount will not contribute to further improvement in the bending strength of the building material. Therefore, up to about 3% by weight is sufficient for the amount of fibers to be added. The production process of the ceramic tile-like aluminous cement-uncalcined building material of the present invention is as follows: 1 part by volume of the aluminous cement-Composition "A: is mixed with about 1 to about 4 parts by volume of aggregate "B" and possibly some other elements to make mortar composition, to which an appropriate amount of water is added. For example, 1 part by volume of Composition "A" is mixed and kneaded together with about 3 parts by volume of aggregate "B" and about 1.5 parts by volume of water, with the mixture then cast in a desired mold to produce the ceramic tile-like aluminous cement-uncalcined building material of the present invention. The mold casting process by itself may be well-known and conventional, which can be applied to the present invention. Generally speaking, the paste mixture is cast into a mold an then kept stationary for about 8 hours, after which the building material of the present invention will be removed from the mold.

In casting of the ceramic tile-like aluminous cement-uncalcined building material of the present invention in a mold, it is particularly preferable that the mold be provided with a smooth surface on the inside that comes into direct contact with the surface of the product. For example, the mold frame is placed on a glass plate, into which then the mortar composition of the present invention is poured up to a necessary thickness, and the process yields tiles of the ceramic tile-like aluminous cement-uncalcined building material. If various other types of molding frames are used in place of the glass plate, the process can easily produce other products such as roofing tiles, paving stones, flower pots and the like, according to the present invention. The ceramic tile-like aluminous cement-uncalcined building material of the present invention can find a broad area of application in a variety of types of building material. For example, the building material of the present invention may be used to make a wide range of products from high-quality bricks, roofing tiles, tiles, cement blocks for gate and wall structures, tiles for both house interior and exterior applications, paving stones, flower-bed bricks, flower pots, to building materials for high-rise building structures. Several types of actual application possibilities of the present invention are described in detail below, with reference to some actual examples and reference case descriptions.

EXAMPLES 1 TO 5 AND REFERENCE CASES 1 TO 5

Each of Compositions "A" shown in the following Table 1 is mixed with average aggregate "B" where aggregate "B" is crush-run having a grain size of 0 to 5 mm and a specific gravity of at least 15 $t/m^3$ at a ratio of "A" to "B"=2 to 8 by volume to produce a mixture. Then, 20 parts by weight of water is added to 100 parts by weight of the said mixture and the resulting composition is kneaded to prepare a paste which is then cast in a triplex shuttering mold, each casting section of which has a size of 4 cm (longitudinal length) by 4 cm (cross width) by 10 cm (depth), to produce testing pieces for a uniaxial compressive strength measurement of the building material.

Another testing piece to be employed for measurement of specular reflection ratio (of the surface of the molded material), water-absorption ratio, hardness and the number of air bubbles appearing on the surface of the building material is obtained by casting the said paste in a tile-type shuttering mold having a size of 8 cm (longitudinal length) by 13 cm (cross width) by 2 cm (thickness or depth), where the tile-type shuttering mold is a plastic mold with a smooth bottom surface. The tile-shaped hardened material thus obtained was tested for its uniaxial compressive strength (7 days after casting), specular reflection ratio (of the surface of the cast material), water-absorption ratio, hardness and the number of air bubbles appearing on the surface. The test results are shown in the following Table 1.

TABLE 1

| No. | | *Ref 1 | *Act 1 | Act 2 | Act 3 | Act 4 | Act 5 | Ref 2 | Ref 3 | Ref 4 | Ref 5 |
| --- | --- | --- | --- | --- | --- | --- | --- | --- | --- | --- | --- |
| Composition "A" | (1) A.C. | 91 | 84 | 81 | 76 | 71 | 68 | 84 | 91 | 76 | 71 |
| | (2) Mn. | 0 | 3 | 5 | 8 | 9 | 10 | 0 | 8 | 5 | 10 |
| | (3)* Zc | 0 | 3.5 | 4 | 5.5 | 9 | 10 | 4 | 0 | 10 | 10 |
| | (4)* Sr | 0 | 0.5 | 1 | 1.5 | 2 | 3 | 3 | 2 | 0 | 0 |
| | (5-7)* St | 9 | 9 | 9 | 9 | 9 | 9 | 9 | 9 | 9 | 9 |
| | Total | 100 | 100 | 100 | 100 | 100 | 100 | 100 | 100 | 100 | 100 |
| Test Items | UniA-C.S.* | 350 | 465 | 470 | 474 | 460 | 435 | 310 | 303 | 297 | 282 |
| | Sp. R. R* | 72 | 92 | 94 | 95 | 95 | 94 | 82 | 77 | 76 | 73 |
| | W.A. R* | .25 | .1 | .08 | .06 | .05 | .06 | .15 | .18 | .20 | .22 |
| | Hn* | 4 | 5 | 6 | 6 | 6 | 6 | 4 | 4 | 4 | 4 |

TABLE 1-continued

| No. | *Ref 1 | *Act 1 | Act 2 | Act 3 | Act 4 | Act 5 | Ref 2 | Ref 3 | Ref 4 | Ref 5 |
| --- | --- | --- | --- | --- | --- | --- | --- | --- | --- | --- |
| No. B.* | 13 | 0 | 0 | 0 | 0 | 1 | 1 | 1 | 11 | 13 |

Legend:
Ref.: Reference case
Act.: Actual application example
(1): Aluminous Cement
(2): Montmorillonite
(3): Zirconia
(4): Stearates
(5–7) St: Standard Value, where (5) is Silica (st.v. at 3), (6) is Gypsum (st.v. at 3) and (7) is Aluminum Sulfate (st.v. at 3)
UniA-C.S.: Uniaxial compressive strength at 7 days (kg/cm$^2$)
Sp.R.R: Specular reflection ratio
W.A.R: Water-absorption ratio
Hn: Hardness
No. B.: Number of air bubbles appearing on the surface
Notes:
1. Water-absorption ratio = (Weight after 24 hours immersion in water − Dry weight)/Dry weight
2. Hardness: Fluorite = 4, apatite = 5, orthoclase = 6, and quartz = 7
3. Number of air bubbles appearing on the surface: The number of air bubbles remaining in the bottom surface of the shuttering mold (area of 10 cm × 20 cm)

EXAMPLES 6 TO 10 AND REFERENCE CASES 6 TO 10

In this series of examples, a lightweight aggregate "B" (barite with specific gravity of less than 1.0) was used in place of the normal aggregate "B" in each of the Actual Examples 1 to 5 and the Reference Cases 1 to 5 described above, at an "A" to "B" ratio of 25 to 75 parts by volume to prepare another set of test pieces. All other remaining conditions for the preparation were identical with those employed in the preparation for Examples 1 to 5 and References 1 to 5 shown in Table 1. Test results for the second test pieces are presented in the following Table 2. As indicated by Table 2, the new test pieces employing the lightweight aggregate "B" show a decline in its uniaxial compressive strength. However, as for other remaining properties, the new test pieces were shown to have substantially the same properties as those in Table 1.

TABLE 2

| No. | | *Ref 6 | *Act 6 | Act 7 | Act 8 | Act 9 | Act 10 | Ref 7 | Ref 8 | Ref 9 | Ref 10 |
| --- | --- | --- | --- | --- | --- | --- | --- | --- | --- | --- | --- |
| Composition "A" | (1)* A.C. | 91 | 84 | 81 | 76 | 71 | 68 | 84 | 91 | 76 | 71 |
| | (2) Mn. | 0 | 3 | 5 | 8 | 9 | 10 | 0 | 8 | 5 | 10 |
| | (3)* Zc | 0 | 3.5 | 4 | 5.5 | 9 | 10 | 4 | 0 | 10 | 10 |
| | (4)* Sr | 0 | 0.5 | 1 | 1.5 | 2 | 3 | 3 | 2 | 0 | 0 |
| | (5–7)* St | 9 | 9 | 9 | 9 | 9 | 9 | 9 | 9 | 9 | 9 |
| | Total | 100 | 100 | 100 | 100 | 100 | 100 | 100 | 100 | 100 | 100 |
| Test Items | UniA-C.S.* | 260 | 310 | 325 | 330 | 320 | 313 | 255 | 238 | 230 | 226 |
| | Sp.R.R* | 72 | 93 | 94 | 95 | 94 | 95 | 81 | 76 | 76 | 74 |
| | W.A.R* | .26 | .1 | .07 | .07 | .05 | .06 | .16 | .18 | .21 | .22 |
| | Hn* | 4 | 5 | 6 | 6 | 6 | 6 | 4 | 4 | 4 | 4 |
| | No. B.* | 12 | 1 | 0 | 0 | 0 | 0 | 2 | 1 | 10 | 13 |

Legend:
Ref.: Reference case
Act.: Actual application example
(1): Aluminous Cement
(2): Montmorillonite
(3): Zirconia
(4): Stearates
(5–7) St: Standard Value, where (5) is Silica (st.v. at 3), (6) is Gypsum (st.v. at 3) and (7) is Aluminum Sulfate (st.v. at 3)
UniA-C.S.: Uniaxial compressive strength at 7 days (kg/cm$^2$)
Sp.R.R: Specular reflection ratio
W.A.R: Water-absorption ratio
Hn: Hardness
No. B.: Number of air bubbles appearing on the surface
Notes:
1. Water-absorption ratio = (Weight after 24 hours immersion in water − Dry weight)/Dry weight
2. Hardness: Fluorite = 4, apatite = 5, orthoclase = 6, and quartz = 7
3. Number of air bubbles appearing on the surface: The number of air bubbles remaining in the bottom surface of the shuttering mold (area of 10 cm × 20 cm)

INVENTION

The following Table 3 shows further test results of the building material of the present invention, when glass wool was added to the mortar composition of Actual Application Example 3, described earlier, at the following percentage ratios, as indicated in the table, based on the total amount by weight of Composition "A" and Aggregate "B". All other remaining conditions in preparation of Examples 11 to 14 below were identical to those employed in preparation of Example 3. Results of the bending strength test conducted 7 days after casting of the material with glass wool addition are shown in Table 3.

TABLE 3

| No. | Act Ex. 3 | Act Ex. 11 | Act Ex. 12 | Act Ex. 13 | Act Ex. 14 |
|---|---|---|---|---|---|
| Glass Wool (wt %) | 0 | 0.5 | 1 | 2 | 3 |
| Bending Strength (7 days later) (kg/cm$^2$) | 37 | 70 | 73 | 75 | 76 |

ACTUAL APPLICATION EXAMPLES 15 TO 18

Table 4 below shows further test results of the building material of the present invention, when glass wool was added to the mortar composition of Actual Application Example 8, described earlier, at the following percentage ratios, as indicated in the table, based on the total amount by weight of Composition "A" and Aggregate "B".

TABLE 4

| No. | Act Ex. 8 | Act Ex. 15 | Act Ex. 16 | Act Ex. 17 | Act Ex. 18 |
|---|---|---|---|---|---|
| Glass Wool (wt %) | 0 | 0.5 | 1 | 2 | 3 |
| Bending Strength (7 days later) (kg/cm$^2$) | 27 | 47 | 49 | 49.5 | 50 |

It is claimed:

1. A mortar composition comprising a composition "A" which comprises in parts by weight based on 100 parts:
   (1) 57-86 parts by weight of aluminous cement;
   (2) 3-10 parts by weight of at least one material comprising montmorillonite, acid clay or bentonite;
   (3) 3-10 parts by weight of at least one material selected from zirconium oxide and magnesium oxide;
   (4) 0.5-3 parts by weight of at least one material selected from alkali salt stearate and alkaline earth metal stearate;
   (5) one material selected from active fine silica or acidic fly ash;
   (6) calcined gypsum; and
   (7) aluminum sulfate;
   wherein each of components (3)-(7) of composition "A" are present in an amount sufficient to improve the long-term stability of said mortar composition; and
   a sufficient amount of an aggregate to provide a volume ratio of aggregate to composition "A" of 1-4.

2. A mortar composition according to claim 1 further comprising 0.5-3% by weight of mineral fibers, based on the total weight of said mortar composition.

3. A mortar composition according to claim 1 wherein composition "A" comprises aluminous cement, montmorillonite, zirconium oxide, an alkali salt stearate or alkaline earth metal stearate, active fine silica, calcined gypsum and aluminum sulfate.

4. A molded article of manufacture which comprises a mortar composition "A" comprising in parts by weight based on 100 parts:
   (1) 57-86 parts by weight of aluminous cement;
   (2) 3-10 parts by weight of at least one material comprising montmorillonite, acid clay or bentonite;
   (3) 3-10 parts by weight of at least one material selected from zirconium oxide and magnesium oxide;
   (4) 0.5-3 parts by weight of at least one material selected from alkali salt stearate and alkaline earth metal stearate;
   (5) one material selected from active fine silica or acidic fly ash;
   (6) calcined gypsum; and
   (7) aluminum sulfate;
   wherein each of components (5)-(7) of composition "A" are present in an amount sufficient to improve the long-term stability of said mortar composition; and
   a sufficient amount of an aggregate to provide a volume ratio of aggregate to composition "A" of 1-4.

5. A molded article of manufacture according to claim 4 wherein the mortar composition further comprises 0.5-3% by weight of mineral fibers, based on the total weight of said mortar composition.

* * * * *